US012688275B1

(12) United States Patent
Ly

(10) Patent No.: US 12,688,275 B1
(45) Date of Patent: Jul. 21, 2026

(54) SYSTEMS AND METHODS FOR DETECTING FRAUDULENT USERS

(71) Applicant: United Services Automobile Association (USAA), San Antonio, TX (US)

(72) Inventor: Vi Quang Ly, Williamsville, NY (US)

(73) Assignee: United Services Automobile Association (USAA), San Antonio, TX (US)

( * ) Notice: Subject to any disclaimer, the term of this patent is extended or adjusted under 35 U.S.C. 154(b) by 92 days.

(21) Appl. No.: 18/918,929

(22) Filed: Oct. 17, 2024

Related U.S. Application Data

(60) Provisional application No. 63/591,357, filed on Oct. 18, 2023.

(51) Int. Cl.
*G06F 21/00* (2013.01)
*G06F 21/50* (2013.01)
*G06Q 20/40* (2012.01)

(52) U.S. Cl.
CPC ......... *G06F 21/50* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 7,562,814 | B1 * | 7/2009 | Shao ...................... | G06Q 20/40 |
| | | | | 235/375 |
| 9,516,053 | B1 * | 12/2016 | Muddu ................ | G06V 10/225 |
| 12,483,576 | B1 * | 11/2025 | Guo .................... | G06F 16/9537 |
| 2018/0349993 | A1 * | 12/2018 | Straub .................. | G06Q 50/265 |
| 2019/0132224 | A1 * | 5/2019 | Verma ...................... | G06F 18/24 |
| 2021/0174367 | A1 * | 6/2021 | Harris ................ | G06Q 20/4016 |
| 2022/0172211 | A1 * | 6/2022 | Muthuswamy ....... | G06F 16/288 |
| 2024/0338703 | A1 * | 10/2024 | Ahlstrom ............... | G06Q 40/04 |
| 2025/0029000 | A1 * | 1/2025 | Dong ...................... | G06N 3/08 |

OTHER PUBLICATIONS

He, Yang et al. Entity Relation Interactive Graph Convolutional Network for Knowledge Embedding. 2023 6th International Conference on Data Storage and Data Engineering (DSDE). https://ieeexplore.ieee.org/stamp/stamp.jsp?tp=&arnumber=10202435 (Year: 2023).*

(Continued)

*Primary Examiner* — Jeremiah L Avery

(74) *Attorney, Agent, or Firm* — BakerHostetler

(57) ABSTRACT

Systems and methods provide for receiving data relating to an entity, wherein the data is categorized according to a plurality of fields, wherein each of the plurality of fields associated with the entity is defined by one of a plurality of field types, and where each of the fields are respectively associated with a plurality of field values. Field values are matched to a matching node in a graph database, wherein the graph database is defined by a plurality of nodes having one of the plurality of field types. The graph database is searched for fuzzy matches and based on finding one or more fuzzy matches, a fraud response action is executed.

20 Claims, 6 Drawing Sheets

(56) References Cited

OTHER PUBLICATIONS

Naveena, Prathi; Rao, P. Krishna Subba. Detection of Near Duplicates over Graph Datasets Using Pruning. 2020 IEEE India Council International Subsections Conference (INDISCON). https://ieeexplore.ieee.org/stamp/stamp.jsp?tp=&arnumber=9344559 (Year: 2020).*
Jin, Guanghua et al. Detecting User Interaction Anomaly based on Social Network Graph Similarity. 2020 IEEE 10th International Conference on Electronics Information and Emergency Communication (ICEIEC). https://ieeexplore.ieee.org/stamp/stamp.jsp?tp=&arnumber=9152339 (Year: 2020).*

* cited by examiner

Figure 2:
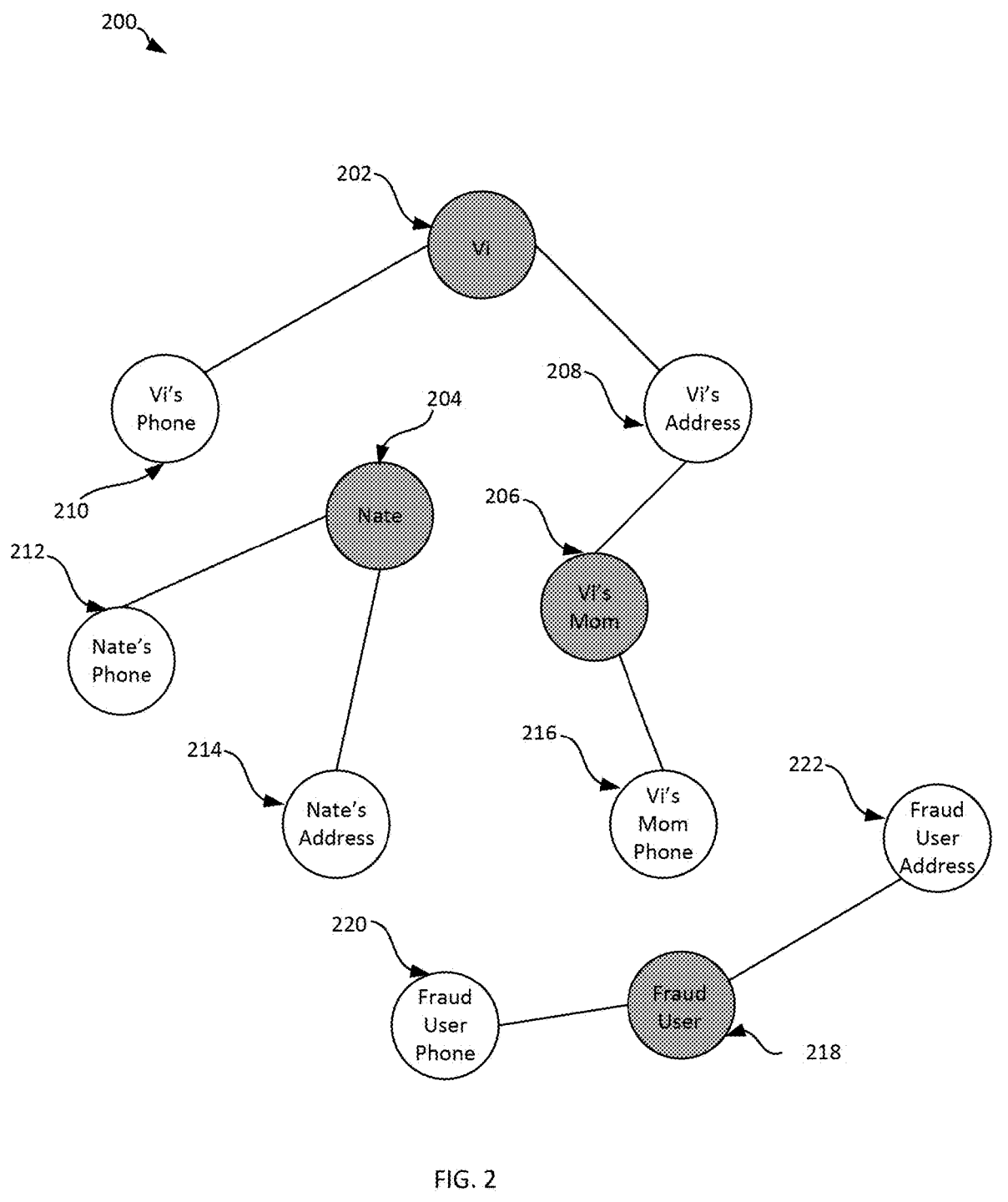

200

202 → Vi

Vi's Phone

208 → Vi's Address

204 → Nate

206

212 → Nate's Phone

210

Vi's Mom

216 → Vi's Mom Phone

214 → Nate's Address

222 → Fraud User Address

220 → Fraud User Phone

Fraud User ← 218

SYSTEMS AND METHODS FOR DETECTING FRAUDULENT USERS

CROSS-REFERENCE TO RELATED APPLICATION(S)

This application claims the benefit of and priority to U.S. Provisional Patent Application No. 63/591,357, titled Systems and Methods for Detecting Fraudulent Users, filed Oct. 18, 2023, the entirety of which is incorporated herein by reference.

TECHNICAL FIELD

The innovations disclosed herein relates to the field of cyber security. More specifically, the present invention relates to detecting fraudulent users or activity based on fuzzy logic and graph data structures.

BACKGROUND

Financial organizations such as banks, credit unions, investment banks and companies, brokerage firms, insurance companies, and mortgage companies provide online services that were previously available only through interaction with a human professional. Such online services offer many benefits. For example, these online services allow users to access to financial services 24x7 and not be limited by working hours, geographical area, etc.

Fraudulent users (including cybercriminals) engage in unscrupulous or criminal activity that targets financial organizations to scam those organizations for monetary gains, confidential information, or other resources. These fraudulent users are either act individually or as a group using advanced techniques to exploit a computer, a computer network, or a networked device of a financial organizations. For example, fraudulent users can create user accounts in financial organizations with the similar identities of people or business and perform operations such as financial transactions etc., without any consent or approval. Other types of organizations can also be targeted with fraudulent accounts or activity to exploit their resources in similar or distinct manners. For example, all organizations operating computing systems may be targeted by bad actors seeking to deploy botnets, monitoring software, ransomware, etc., and such attacks may be made more feasible if fraudulent accounts can be created and go undetected.

Financial organizations have undertaken various measures to defend themselves against unauthorized activity. However, constant innovation is needed to remain at least one step ahead of such fraudulent users. What is needed is a method and system for facilitating identification of potentially fraudulent activity in a financial system.

SUMMARY

In an embodiment, a method comprises retrieving account information of a plurality of users comprising user information from a datastore; generating a graph using the retrieved account information, wherein generating the graph further comprising: generating a plurality of user nodes to represent each of the plurality of users; generating a plurality of field nodes to represent a plurality of fields associated with the plurality of users, and wherein each of the plurality of field nodes includes a value for the respective field; generating one or more edges between each user node and each field node associated with each user node; identifying a node pair, wherein each node pair comprises a first field node with an edge to a first user node and a second field node with an edge to a second user node, wherein the first field node and the second field node represent the same type of field; determining a similarity score between the first field node and the second field node of the node pair; connecting the first field node and the second field node via an edge if the similarity score is more than a pre-specified threshold; and determining one or more cliques in the graph.

In an embodiment, a system comprises a data interface module configured to retrieve account information of a plurality of users comprising user information from a datastore; generate a graph using the retrieved account information, wherein generating the graph further comprising: generate a plurality of user nodes to represent each of the plurality of users; generating a plurality of field nodes to represent a plurality of fields associated with the plurality of users, and wherein each of the plurality of field nodes includes a value for the respective field; generate one or more edges between each user node and each field node associated with each user node; identify a node pair, wherein each node pair comprises a first field node with an edge to a first user node and a second field node with an edge to a second user node, wherein the first field node and the second field node represent the same type of field; determine a similarity score between the first field node and the second field node of the node pair; connect the first field node and the second field node via an edge if the similarity score is more than a pre-specified threshold; and determine one or more cliques in the graph.

In an embodiment, a non-transitory computer-readable medium is provided. The non-transitory computer-readable medium stores instructions that when executed by a processor perform operations. The operations effectuate: retrieving account information of a plurality of users comprising user information from a datastore; generating a graph using the retrieved account information, wherein generating the graph further comprising: generating a plurality of user nodes to represent each of the plurality of users; generating a plurality of field nodes to represent a plurality of fields associated with the plurality of users, and wherein each of the plurality of field nodes includes a value for the respective field; generating one or more edges between each user node and each field node associated with each user node; identifying a node pair, wherein each node pair comprises a first field node with an edge to a first user node and a second field node with an edge to a second user node, wherein the first field node and the second field node represent the same type of field; determining a similarity score between the first field node and the second field node of the node pair; connecting the first field node and the second field node via an edge if the similarity score is more than a pre-specified threshold; and determining one or more cliques in the graph.

The details above in this Summary are intended to describe only some aspects relating to certain embodiments of the innovations herein and should not be deemed in any way limiting with respect to requiring or omitting any aspect for embodiments to be claimed or otherwise limiting the disclosure or embodiments keeping with its scope or spirit.

BRIEF DESCRIPTION OF THE DRAWINGS

FIG. 2 depicts an example graph that includes user nodes and field nodes.

Figure 1:
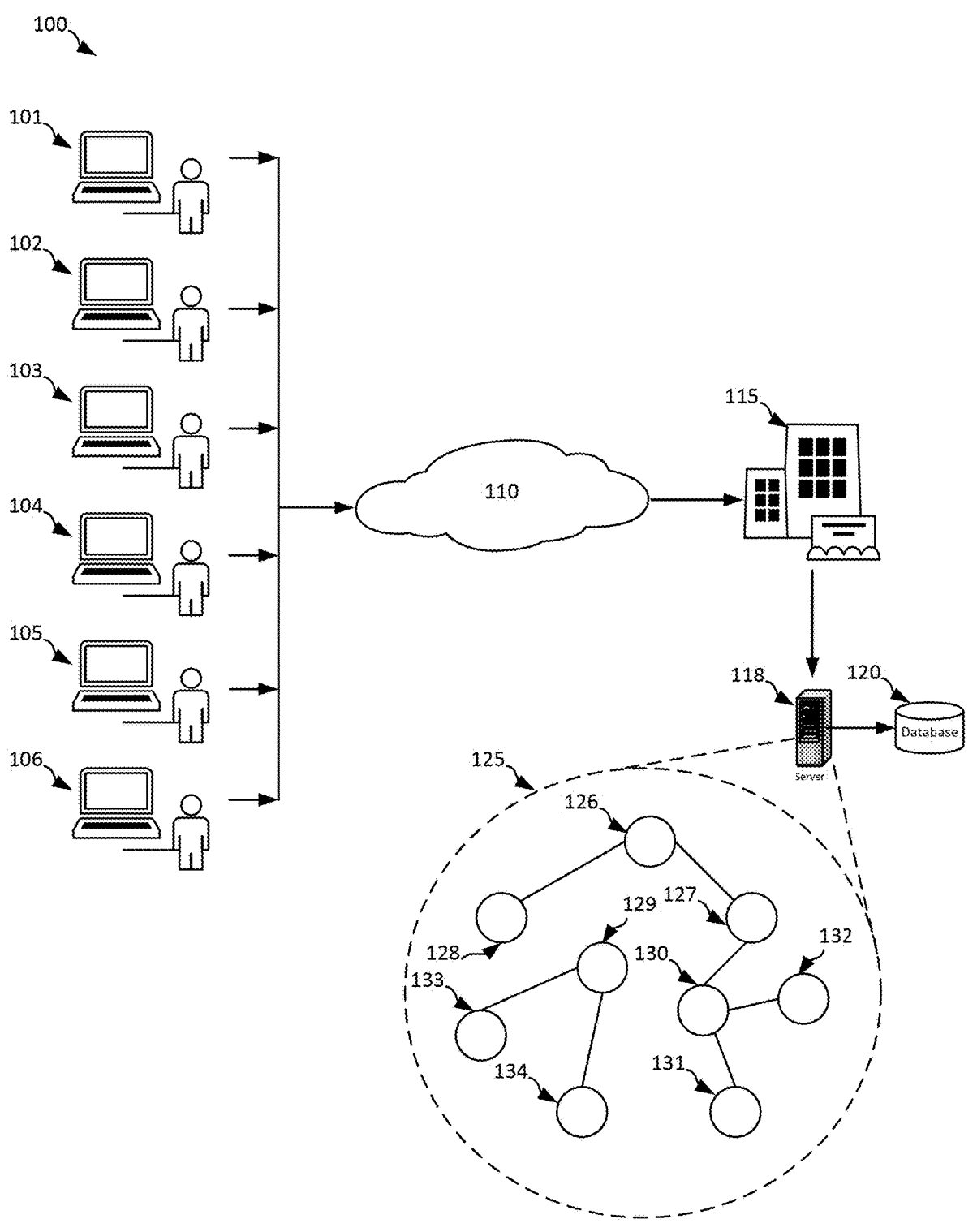
FIG. 1 depicts an example environment where users can access financial services.

The details above in the Brief Description of the Drawings are intended to describe only some aspects relating to certain embodiments of the innovations herein and should not be deemed in any way limiting with respect to requiring or omitting any aspect for embodiments to be claimed or otherwise limiting the disclosure or embodiments keeping with its scope or spirit.

DETAILED DESCRIPTION

Examples described herein provide methods, system, and instructions on a computer readable medium to identify fraudulent users and accounts. By identifying fraudulent data, and thereby identifying fraudulent users and accounts, appropriate measures can be taken to protect the integrity of the financial organization.

Many tactics for fraud (or similar crimes or attacks) reuse data or resources, such as email accounts or phone numbers. Watchlists can be created for such datapoints associated with fraud. Traditional methods of searching for data known to be fraudulent are highly intensive of computer resources, requiring one-to-one comparisons of each datapoint submitted in connection with, e.g., account information, communications, et cetera, and information identified as fraudulent. Large organizations may receive hundreds, if not thousands, of such inputs daily, and may have watchlists that themselves contain thousands of data points.

Beyond exact matches, entities that perpetrate fraud (or similar crimes or attacks) often do not use exact data points that would be reflected in a watch list, but instead utilize variants thereof, or select data according to patterns that correspond to other data known to be fraudulent. Such data can still be detected by performing fuzzy matching, such as using edit distances (e.g., Levenshtein distance, Jaro-Winkler distance, et cetera). However, calculating edit distances (or performing other fuzzy matching techniques) according to pairwise comparisons between incoming data and watch list data becomes even more computationally unwieldy.

To resolve these problems, a data structure and algorithm are disclosed herein to identify similar patterns in data such as personally identifiable information ("PII") submitted in connection with accounts, requests, et cetera, to flag fraudulent or potentially fraudulent data. Within a dataset (which can be a graph data structure, in lieu of a watchlist), a clique (or "neighborhood" or "community") can be identified, and within that clique pairwise fuzzy matching can be performed among nodes of the same node type.

In a graph data structure as described above, each account (or user/member/et cetera) can have multiple associated node types. These can be different types of PII or other information associated with a field, such as, e.g., primary email, secondary email, mobile phone number, work phone number, address, account number, related account number, social security number, et cetera. Edges exist between matches of each node type (in various embodiments or in various situations within the algorithm, exact matches or exact matches and fuzzy matches), thereby linking different accounts. Continuing with this example, families who live together will share at least one edge between accounts due to a common address. And, likewise, fraudsters who reuse information in an effort to create or populate fraudulent accounts will show linked accounts.

To prevent the graph from becoming too large, the graph can be limited to a clique determined by a number of "hops" (e.g., intervening edges between nodes). For example, a member's address can link to their spouse (one hop), then the spouse's email address (two hops), and then fraudulent variants of that email (three hops, with edges created for fuzzy matches). The clique size can be set arbitrarily by an administrator, developer, or others.

To perform in-stride matching, when new account (or member/user/et cetera) data is received, existing data can be searched for exact matches. If an exact match is found, that account is added to one or more clique by creating edges between that data and the matches. From there, fuzzy matching can be performed on each node of the new account within the clique. Where fuzzy matches within the clique are found, fraud patterns may be identified. Further, this can also expose legitimate accounts or identities being targeted by fraudsters. A ratio or score can be calculated quantifying the similarity of accounts based on matched nodes (exact and/or fuzzy matching, which can have different values or weights), and if that ratio or score exceeds a threshold, an action can be taken such as locking an account as fraudulent or rejecting a transaction associated with the account.

Such a graph structure and algorithm for searching the graph structure take advantage of cybercriminal's tendency to reuse data, or at least portions thereof, due to repeat attempts, volumes of attempted fraud, common tactics or "playbooks," and/or other reasons. Fuzzy matching allows for the identification of new patterns, but constraining such matching to a clique and node types reduces the computational resources required to search for potentially fraudulent data. This extends the capabilities of computers, which may not be able to perform, in real-time, screening for fraudulent data due to the number of computations required to search all incoming data for data on a watchlist, variants thereof, or patterns related thereto. Moreover, the functioning of computers involved is improved because at least their compute and network resources are not consumed with pairwise comparisons or fuzzy matching that, statistically, is unlikely to result in findings of consequence—for large datasets/lengthy watch lists, the vast majority of comparisons, if not all, will fail to detect fraud. This improves fraud detection technology, particularly for large enterprises that manage myriad accounts and provide access using online or other remote services.

Where a fuzzy match is found between two nodes of the same type within a clique, an action can be taken (e.g., automatically or in response to an intervening notification). Further, new matches can be aggregated in reports that can be analyzed (in embodiments, automatically) to identify new fraud patterns or scripts.

FIG. 1 is a block diagram of an example environment 100 where users 101-106 can remotely access numerous services provided by a financial organization 115 over the network 110. The network 110 can include several types of computer networks, such as a local area network (LAN), wide area network (WAN), and/or the Internet. The users 101-106 can use an application such as a web-browser or an application issued by the financial organization (or any third-party organization) on their user devices to communicate with the financial organization 115. Examples of user devices can include, but are not limited to, smart phones, wearable computing devices (example, watches), tablet computers, laptop computers, desktop computers, and additional computing device form factors. The financial organization 115 can deploy a server 118 to render numerous services. The server 118 can be implemented as a centralized computing system or as a distributed computing system.

In some embodiments, the users can provide information such as name, date of birth, social security number (SSN), email-id, address, etc., to create a profile (also referred to as a user account) to receive the services provided by the financial organization. The sever 118 can be further connected to a database 120. The database 120 can be configured to store user information. In addition, the database 120 can store a variety of information related to customer accounts such as login information (example, username, password, user identification), payment information (example, credit card details, bank account number), account information (example, account history, creation time of the account), etc. Besides users who are legitimate (in other words authorized), one or more fraudulent users can also create user accounts in the financial organization 115. These fraudulent accounts can be based on information of legitimate users that has been obtained using illegal means. Fraudulent users can also utilize various scripts or programs, libraries, or "playbooks" that include reused information that may be present in multiple accounts whether that individual piece of data relates to a legitimate user or not.

Fraudulent users can impersonate as a legitimate user by creating fraudulent accounts using variations of the legitimate user information or reused information (whether relating to a legitimate user or not) that matches the requirements for account creation. For example, if a legitimate user has a name John Doe and an email-id john.doe@email.com, a fraudulent account can be created using the name John Doe and by using an alternate email-id john1.doe@email.com. Similarly, another fraudulent account can be created where the name of the user is Johny Doe having an email-id johny.doe@email.com. As one can see, fraudulent users can generate a plethora of fake user information and create multiple fraudulent user accounts. This can (but need not) be done using a combination of known information and minor variants (e.g., detectable using fuzzy matching) of known information.

Detecting fraudulent users and accounts is a challenging task. For example, assume that a financial organization 115 has a watchlist of 1000 emails. Suppose john.doe@email.com is an email known for fraudulent activity. However, if fraudulent users used a variation of the email, such as john.doe1@email.com to create a user account or receive services from the financial organization, the financial organization will not be able to detect the fraudulent email using exact matching since there is no exact match, and the email would not be identified. The problem further escalates when the email needs to be compared with all 1000 emails on the watchlist. Suppose the financial organization had 1000 applicants per day. (While the example of applicants for an account is used here, it is understood that these techniques are pertinent to any instance in which a user provides information to an organization to obtain an account or access) In this case, each of the applicant's email must be compared to all 1000 emails on the watchlist. This would result in 1,000,000 comparisons (1000 applicant emails*1000 emails on watchlist). As a result, scalability becomes an issue. Broadening this out to include fuzzy matching, a tremendously higher number of comparisons would need to be completed to search for fuzzy matches for all applicant emails and all entries on the watch list, resulting in extreme computational expense.

In some embodiments, the server 118 can include a fraudulent user detection system that is configured to access information stored in the database 118 to identify users and/or accounts that are suspected to be fraudulent. In some embodiments, the fraudulent user detection system can be further configured to extract one or more features from the users and their respective accounts such as online activity, system logs, etc., to determine similarities with known fraudulent users and fraudulent accounts to mark users and user accounts as potentially suspicious. In some embodiments, the fraudulent user detection system can further include one or more machine learning models for feature extraction and feature selection that can be used to mark users and user accounts as potentially suspicious.

To identify fraudulent users and accounts, the fraudulent user detection system can generate a graph where nodes represent users and user information. As an example, FIG. 1 depicts a disconnected graph structure 125 having nodes 126-134. In this example, nodes 126, 129 and 130 represent different users (also referred to as user nodes). The remaining nodes 127, 128, 131-134 are nodes that represent user information (also referred to as field nodes). In some embodiments, each field node has a type which is based on the type of user information that included in the node. Types of user information can include address, primary phone number, alternate phone number, primary email, alternate email, SSN, etc. For example, a field node that includes an address of a user is assigned a type "address." Similarly, a field node that includes a phone number of a user is assigned a type "number." This is further explained with reference to FIG. 2.

FIG. 2 is a visual representation of an example graph 200 that includes user nodes and field nodes. As seen in FIG. 2, node 202 is a user node of a user "Vi". Nodes 208 and 210 are field nodes wherein the node 208 includes the address of the user "Vi" and the node 210 includes the phone number of the user "Vi". Similarly, node 206 represents another user "Vi Mom". The user "Vi's Mom" is related to the user 202 since they both have the same address. Both the nodes 202 and 206 are connected to node 208. Node 216 includes the phone number of the user "Vi's Mom". The graph 200 further includes user node 204 that is related to field nodes 212 and 2124. Finally, graph 200 also includes a fraudulent user represented by a user node 218. Node 218 is connected to field nodes 220 and 222 representing phone number and address, respectively.

In some embodiments, after generating the graph 200, the fraudulent user detection system can generate a similarity score between a pair of nodes of the same type where the first node of the pair and the second node of the pair are connected to different user nodes. For example, consider two nodes 216 and 220 that includes the phone number of the user "Vi's Mom" and the fraudulent user, respectively. The fraudulent user detection system can compare the phone numbers to determine a similarity score between the phone numbers. As for another example, consider two nodes 214 and 222 that includes the addresses of user "Nate" and the fraudulent user, respectively. The fraudulent user detection system can compare the addresses to determine a similarity score.

In some embodiments, the similarity score can be based on string-matching techniques such as Hamming distance, Levenshtein distance, etc. For example, the similarity score computed using a function or a machine learning model parameterized in parts by the Levenshtein distance. Like in the previous example, assume that the phone number of user "Vi's Mom" is 2202221111 and the phone number of the fraudulent user is 2232221111. The fraudulent user detection system can compare the two phone numbers and determine that the Levenshtein distance between the two phone numbers is 1. Since the Levenshtein distance between the two phone numbers is 1, the fraudulent user detection system can further determine a high similarity score between the phone numbers. In some embodiments, the similarity scores can range from 0 to 1.

In some embodiments, if the similarity score between the pair of nodes is more than a certain pre-specified threshold, the fraudulent user detection system can conclude that the information in the pair nodes are variations of each other. In some embodiments, after determining the similarity score between a pair of nodes, the fraudulent user detection system can create new edges connecting the nodes of the pair. For example, if the prespecified threshold is 0.80, then for any pair nodes that have a similarity score more than 0.80, the fraudulent user detection system creates an edge connecting the nodes of the pair. In the example discussed above, assume that fraudulent user detection system compares the two phone numbers and determines a similarity score of 0.95. Following this determination, the fraudulent user detection system creates an edge connecting the nodes 216 and 210. In some embodiments, the fraudulent user detection system can compare every permutation of the pair of nodes in the graph 200 to determine a respective similarity score and create new edges whenever it determines that the similarity score is more than the pre-specified threshold.

In some embodiments, the fraudulent user detection system can process the graph to determine one or more cliques (e.g., groups of nodes connected by edges based on common data; may also be called "neighborhoods" or "communities;" can be entire graphs). A clique can be a collection of nodes in an undirected graph G such that every two different nodes in the clique are connected by an edge. In some embodiments, if the fraudulent user detection system is unable to determine cliques in the graph 200, the fraudulent user detection system can conclude that none of the user accounts in the database 120 are fraudulent. If the fraudulent user detection system can determine cliques in the graph 200, the fraudulent user detection system can conclude that there are users with user information that are similar which can serve as a possible indication for fraudulent users.

For example, if there are three user accounts with email-ids john.doe@email.com, john.do1@email.com, and john.d0e@email.com respectively, the graph 200 will include three user nodes connected to a respective field node that includes the respective email-ids. The fraudulent user detection system can then create three pairs of nodes for comparison. These node pairs would be 1. (john.doe@email.com, john.do1@email.com), 2. (john.doe@email.com, john.d0e@email.com), and 3. (john.do1@email.com, john.d0e@email.com). Since the Levenshtein distance between the email-ids in each of the pair is 1, the fraudulent user detection system will determine a high similarity score for each of the pairs. For brevity, assume that the similarity score for each of the pairs is more than the pre-specified threshold. The fraudulent user detection system can then generate edges to connect the nodes of each of the three pairs of nodes. The newly generated edges would result in a clique in the graph 200 indicating that the user information i.e., the email-ids of the respective user accounts are similar thereby indicating a possibility of fraudulent users. In response to determining the possibility of fraudulent users, the fraudulent user detection system can generate a request for human evaluators to intervene and verify the user accounts. For example, the fraudulent user detection system can collect user account information and transmit the information to a review panel consisting of human evaluators. These human evaluators can then analyze the information to determine whether the users and the associated user accounts are fraudulent.

In some embodiments, the financial organization 115 has prior knowledge of users and user accounts that are fraudulent. For example, the financial organization 115 can maintain a list of fraudulent users, user accounts and user information (referred to as a fraud user list.) In such embodiments, in response to detecting cliques in the graph 200, the fraudulent user detection system can compare the user accounts associated to the nodes of the cliques to the user accounts in the fraud user list. If after comparison, the fraudulent user detection system determines a match between the user accounts associated to nodes of the clique and fraud user list, the fraudulent user detection system can determine that the user accounts and the respective users are also fraudulent and prevent the fraudulent users from accessing the services provided by the financial organization.

In some embodiments, the methods and techniques described herein can be used to determine whether a new user is a fraudster. In such embodiment, the fraudulent user detection system maintains a graph 200 rather than generating a new graph. In such embodiments, the fraudulent user detection system can retrieve user information (for example, from the web server of the financial organization where the user provided user information to register with the financial organization 115), generate nodes based on the user information and merge the nodes in the graph 200. It can then determine the similarity between newly added nodes and nodes of the graph 200 to determine a similarity score. Based on the similarity score, the fraudulent user detection system can generate edges and determine cliques with respect to the newly added nodes to the graph 200. If the fraudulent user detection system can identify cliques, it can request for human intervention or conclude that the new user is a fraudster.

Figure 3:
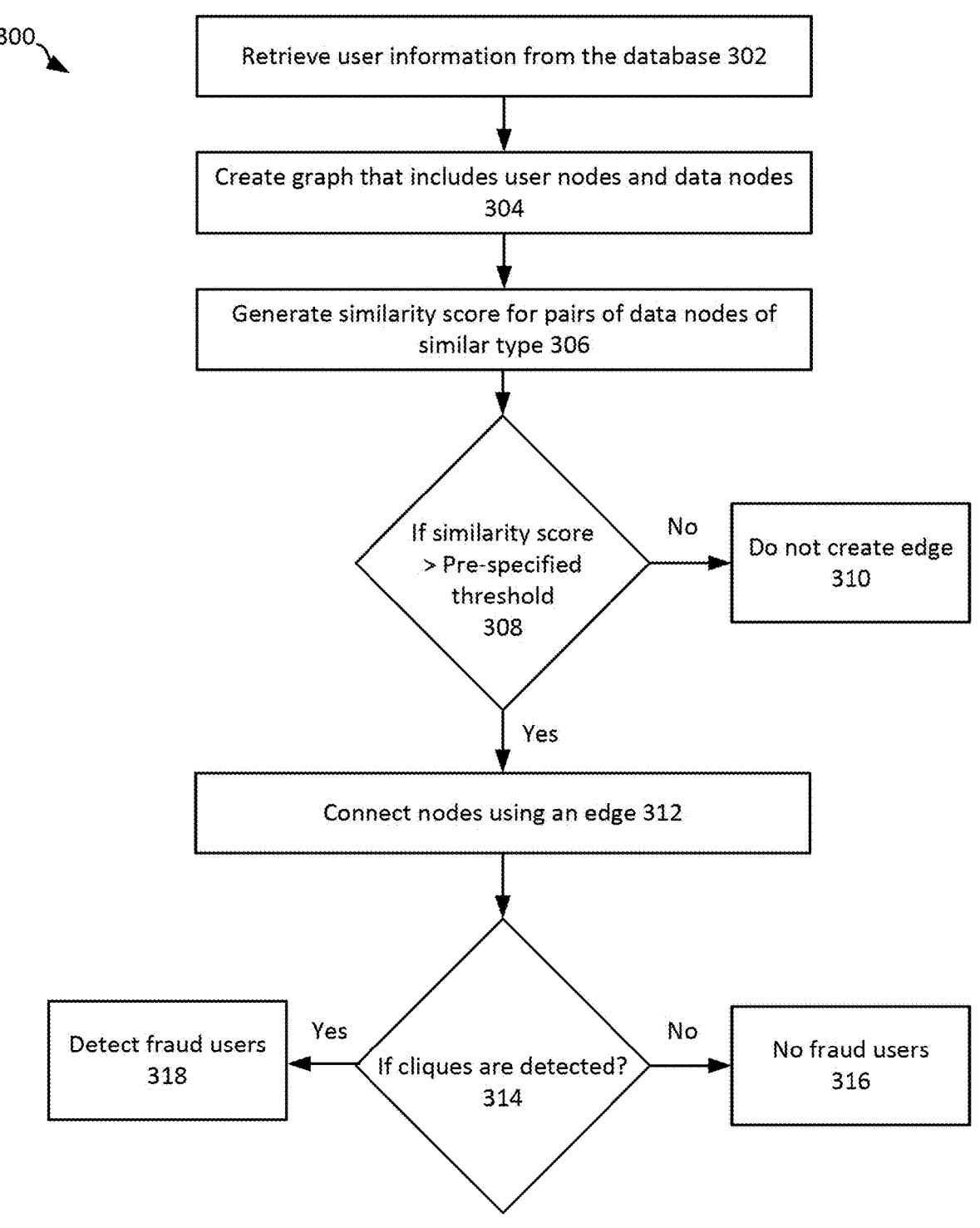
FIG. 3 illustrates an example method for detecting fraudulent users.

FIG. 3 is a flowchart illustrating an example method 300 according to implementations disclosed herein. For convenience, the operations of the flow chart have been described with reference to a system that performs the operations. This system may include various components of various computer systems, such as one or more components of computing systems that implement the fraudulent user detection system. Moreover, while operations of method 300 are shown in a particular order, this is not meant to be limiting. One or more operations can be reordered, omitted, or added.

At block 302, the fraudulent user detection system is configured to access information stored in the database 118 to identify users and/or accounts that are suspected to be fraudulent. The fraudulent user detection system can be further configured to extract one or more features from the users and their respective accounts such as online activity, system logs, etc., to determine similarities with known fraudulent users and fraudulent accounts to mark users and user accounts as potentially suspicious.

At block 304, the fraudulent user detection system can generate a graph where nodes represent users and user information. FIG. 1 depicts a graph structure 125 having user nodes 126, 129 and 130 that represents different users. The graph also includes field nodes 127, 128, 131-134 are nodes that represent user data. Each field node has a type which is based on the type of user information included in the node. For example, a field node that includes an address of a user is assigned a type "address." Similarly, a field node that includes a phone number of a user is assigned a data type number.

At block 306, the fraudulent user detection system generates a similarity score between a pair of nodes of the same type where the first node of the pair and the second node of the pair are connected to different user nodes. The similarity score can be based on string-matching techniques such as Hamming distance, Levenshtein distance, etc.

At block 308, the fraudulent user detection system compares the similarity score to a pre-specified threshold.

At block 312, if the similarity score between the pair of nodes is more than a certain pre-specified threshold, the fraudulent user detection system can create new edges connecting the nodes of the pair. For example, if the pre-specified threshold is 0.80, then for any pair nodes that have a similarity score more than 0.80, the fraudulent user detection system creates an edge connecting the nodes of the pair. The fraudulent user detection system can compare every pair of nodes in the graph to determine a respective similarity score and create new edges whenever it determines that the similarity score is more than the pre-specified threshold.

At block 310, if the similarity score is less than the pre-specified threshold, the fraudulent user detection system does not create a new edge connecting the nodes of the pair.

At block 314, the fraudulent user detection system can process the graph to determine one or more cliques.

At block 316, if the fraudulent user detection system is unable to determine cliques in the graph 200, the fraudulent user detection system can conclude that none of the user accounts in the database 120 are fraudulent.

At block 318, if the fraudulent user detection system can determine cliques in the graph 200, the fraudulent user detection system can conclude that there are users with user information that are similar which can serve as a possible indication for fraudulent users.

Due to the nature of data involved—e.g., PII—security measures can be taken around the data. In embodiments, authentication may be required of an account associated with providing new data. In embodiments, data may be encrypted (and, in embodiments, decrypted) in transit, at rest, or in connection with its use when being handled or compared for exact or fuzzy matching.

Figure 4:
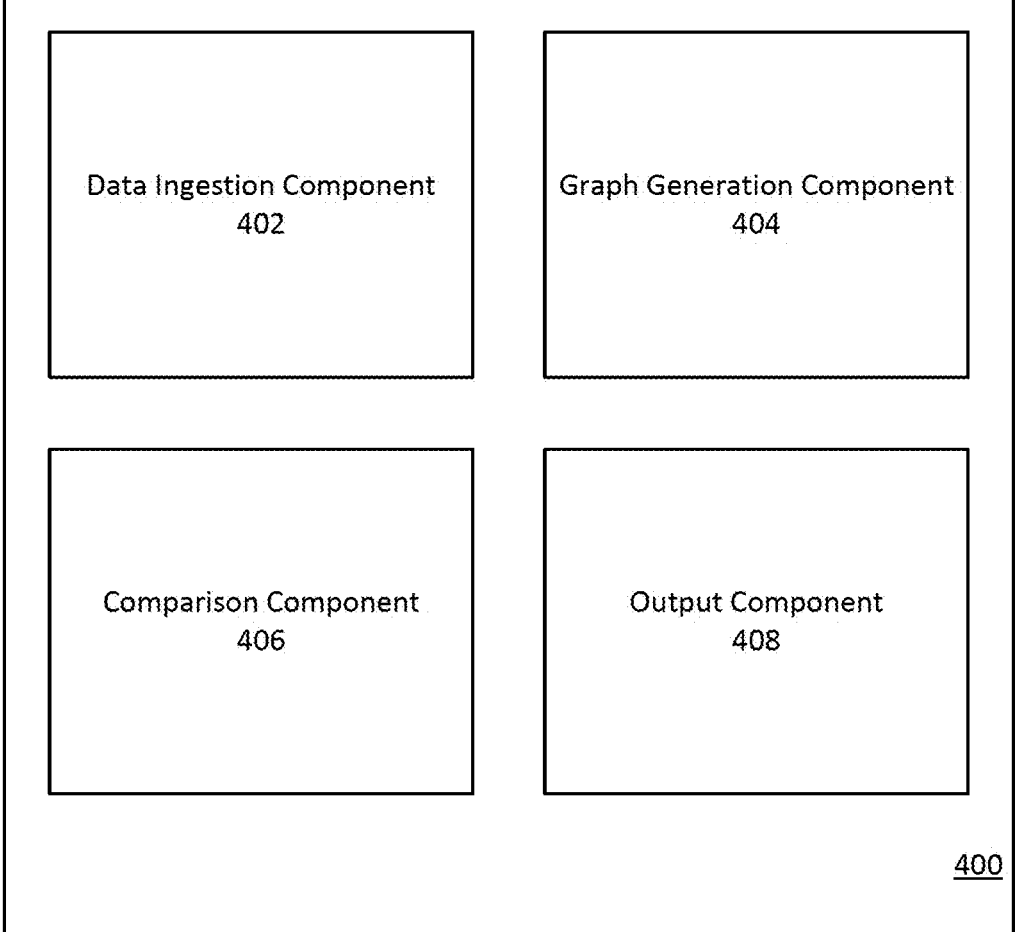
FIG. 4 illustrates an example system for detecting fraudulent users.

FIG. 4 illustrates a system 400 for performing aspects disclosed herein. System 400 can include, e.g., data ingestion component 402, graph generation component 404, comparison component 406, and output component 408.

Data ingestion component can be configured to receive the various information for one or both of generating one or more graphs and interrogating incoming data for fraudulent information, variations, or patterns. In particular embodiments data ingestion component 402 can be configured to, e.g., retrieve account information of a plurality of users comprising user information from a datastore. Data ingestion component 402 can also be configured to perform other aspects described herein.

Graph generation component 404 can be configured to perform one or more operations relating to creating a graph with ingested data. In particular embodiments graph generation component 404 can be configured to generate a graph using the retrieved account information. Generating a graph using the retrieved account information can comprise generating a plurality of user nodes to represent each of the plurality of users. Generating a graph using the retrieved account information can comprise generating a plurality of field nodes to represent a plurality of fields associated with the plurality of users, and wherein each of the plurality of field nodes includes a value for the respective field. Generating a graph using the retrieved account information can comprise generating one or more edges between each user node and each field node associated with each user node. Generating a graph using the retrieved account information can comprise identifying a node pair, wherein each node pair comprises a first field node with an edge to a first user node and a second field node with an edge to a second user node, wherein the first field node and the second field node represent the same type of field. Generating a graph using the retrieved account information can comprise determining a similarity score between the first field node and the second field node of the node pair. Generating a graph using the retrieved account information can comprise connecting the first field node and the second field node via an edge if the similarity score is more than a pre-specified threshold. In embodiments, graph generation component 404 can also determine one or more cliques in the graph based on an edge limit (e.g., number of "hops") defining at least one clique.

In embodiments, graph generation component 404 can identify one or more user nodes in the graph, wherein the one or more user nodes are a member of the determined one or more cliques. In such embodiments, graph generation component can report the identified one or more user nodes for further review. In further embodiments, reporting the identified one or more user nodes for further review further comprises preventing the users associated to the identified one or more user nodes from performing any transactions.

In various embodiments the graph can be, e.g., an undirected graph, a disconnected graph, or other types.

Comparison component 406 can compare data to data within a generated graph. In particular embodiments, comparison component 406 is configured to receive data relating to an entity, wherein the data is categorized according to a plurality of fields, wherein each of the plurality of fields associated with the entity is defined by one of a plurality of field types, and where each of the fields are respectively associated with a plurality of field values. In particular embodiments, comparison component 406 is configured to match at least one of the field values to a value associated with a matching node in a graph database, wherein the graph database is defined by a plurality of nodes having one of the plurality of field types, and wherein the matching node has the same type as the field associated with the at least one of the field values. In particular embodiments, comparison component 406 is configured to search the graph database for fuzzy matches for each of the plurality of field values relating to the entity by comparing each of the plurality of field values to a subset of the plurality of nodes having one of the plurality of field types matching the one of the plurality of field types associated with the respective one of the plurality of field values.

Output component 408 is configured to take action in response to a finding of fraudulent data. In embodiments, output component 408 can, based on finding one or more fuzzy matches, execute a fraud response action. In embodiments, output component 408 can be configured to generate a report including the one or more fuzzy matches and transmitting the report to one or more evaluators. In such embodiments, the one or more evaluators comprises one or more machine learning models configured to evaluate the report and determine a validity of the report. Such machine learning models can be trained on known fraudulent data to perform identification of variants in known fraudulent data (e.g., "watchlist" data) as well as identification of patterns to determine new data or new tactics in fraud attempts.

In embodiments, output component 408 can take or cause automated actions relating to the fraud response action. These can include, e.g., freezing or closing accounts, blocking transactions, preventing actions or changes relating to an account, et cetera.

In embodiments, a fraud response can be dependent on a confidence or threshold regarding fraud being met. In embodiments, wherein each of the one or more fuzzy matches is assigned a value and executing the fraud response is based on an aggregate of the values exceeding a response threshold. In embodiments, multiple thresholds can exist, and different actions can be taken in response to different thresholds.

In embodiments, various distances can be determined in fuzzy matching. Particularly, one or both of graph generation component 404 and comparison component 406 can be configured to determine a distance between the value of the first field node and the value of the second field node and calculate a similarity score based on the determined distance. The distance can be an edit distance, which can include, e.g., one or more of a Levenshtein distance or a Jaro-Winkler distance.

Figure 5:
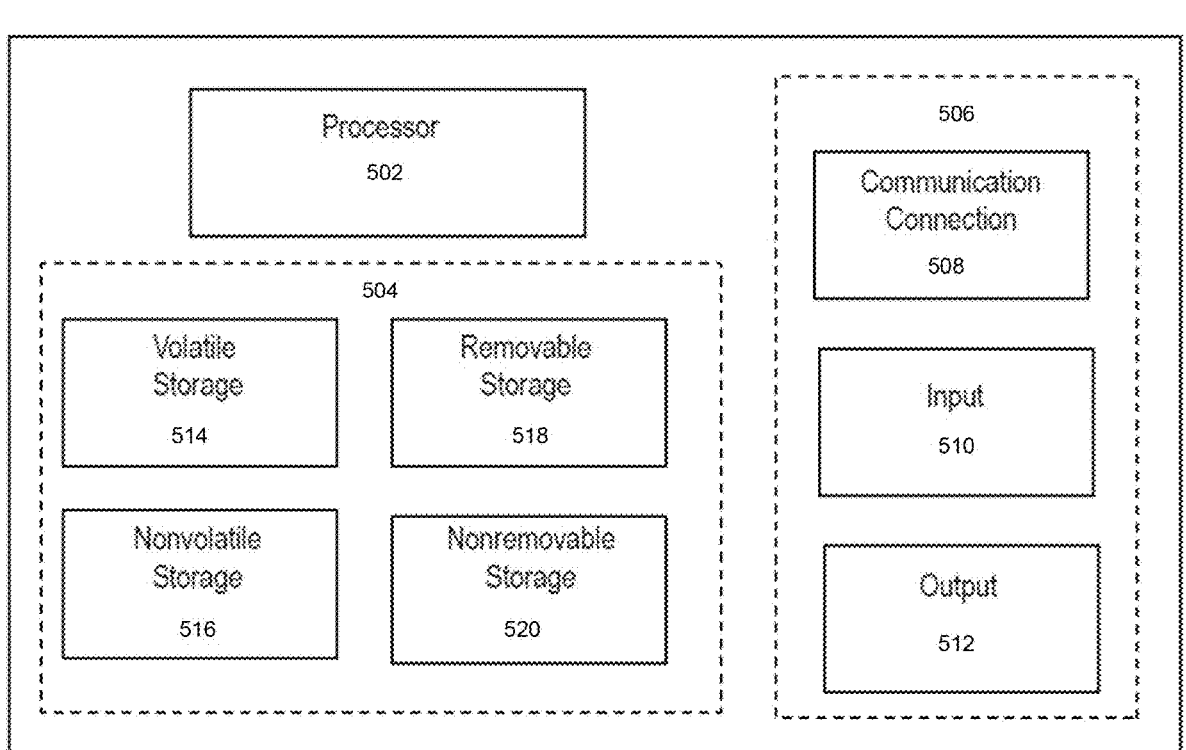
FIG. 5 depicts an example computing environment for implementing certain aspects disclosed herein.

Shown in FIG. 5, device 500 may comprise all or a part of system 100 and/or implement some or all of method 300. Device 500 may comprise hardware or a combination of hardware and software. The functionality to facilitate telecommunications via a telecommunications network may reside in one or combination of network devices 500. Device 500 depicted in FIG. 5 may represent or perform functionality of an appropriate device 500, or combination of network devices 500, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 5 is an example and not intended to imply a limitation to a specific implementation or configuration. Thus, device 500 may be implemented in a single device or multiple devices (example, single server or multiple servers, single gateway or multiple gateways, single controller, or multiple controllers). Multiple network entities may be distributed or centrally located. Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with mapping wireless signal strength. As evident from the description herein, device 500 is not to be construed as software per se.

In addition to processor 502 and memory 504, device 500 may include an input/output system 506. Processor 502, memory 504, and input/output system 506 may be coupled together to allow communications therebetween. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example, input/output system 506 may include a wireless communication (example, Wi-Fi/2.6G/3G/4G/5G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (example, infrared), electromagnetic means (example, radio frequency (RF), Wi-Fi, Bluetooth®, ZigBee®), acoustic means (example, speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of device 500 also may contain communication connection 608 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 510 such as keyboard, mouse, pen, voice input device, or touch input device. Input/output system 506 may also include an output device 512, such as a display, speakers, or a printer.

Processor 502 may be capable of performing functions associated with telecommunications, such as functions for processing broadcast messages, as described herein. For example, processor 502 may be capable of, in conjunction with any other portion of device 500, determining a type of broadcast message and acting according to the broadcast message type or content, as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal.

Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of random-access memory), a nonvolatile storage 516 (such as ROM, flash memory), or a combination thereof. Memory 504 may include additional storage (example, a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations to map signal strengths in an area of interest.

Figure 6:
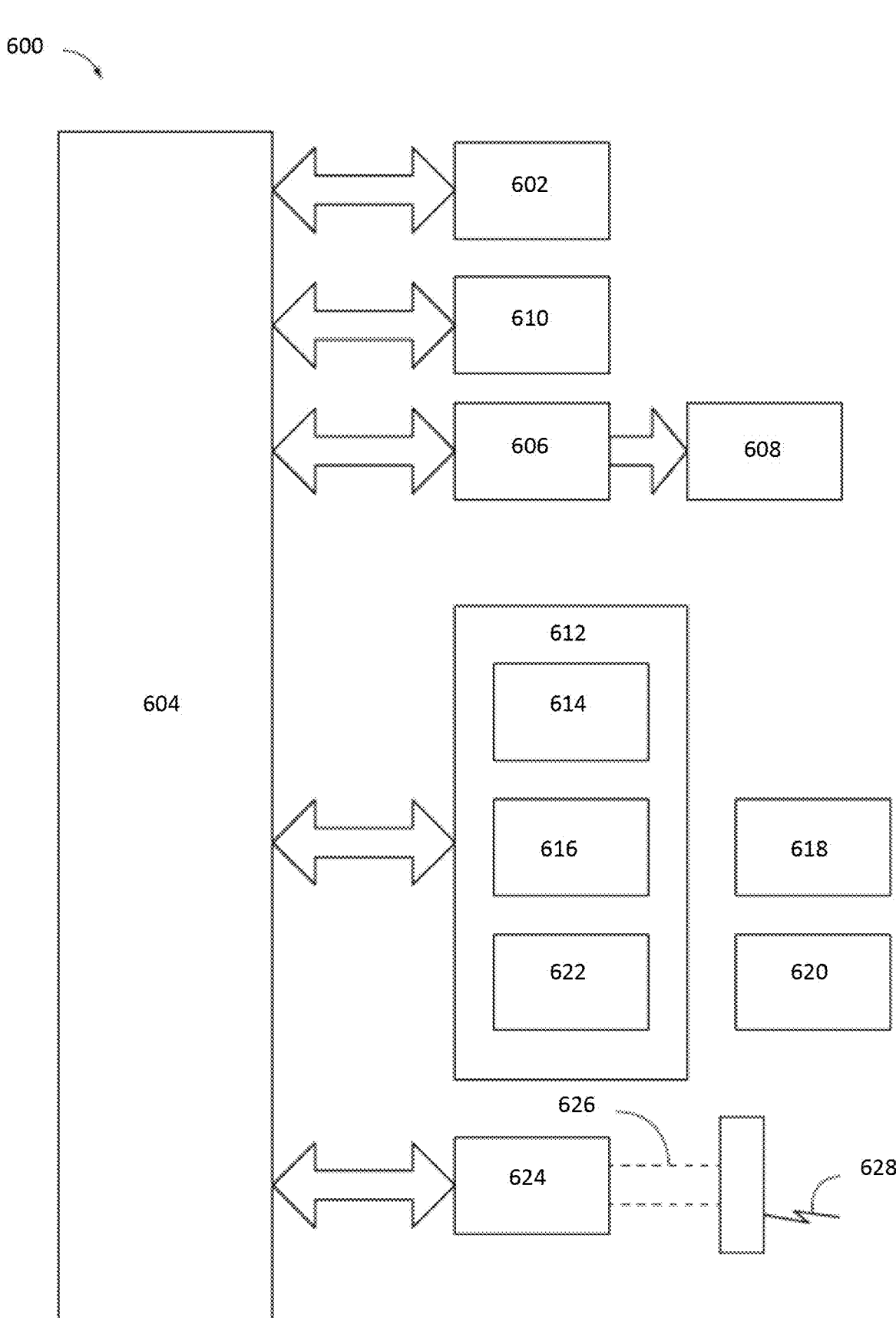
FIG. 6 depicts an example network environment for implementing certain aspects disclosed herein.

FIG. 6 illustrates a computer-based system 600 that may constitute or include parts of system 300 and/or implement some or all of method 300. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 04 or from a frame buffer (not shown) for display on a display unit 608.

Computer-based system 600 further includes a main memory 10, such as random-access memory (RAM), and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical, or other signals capable of being received by communication interface 624. Signals 626 may be provided to communication interface 624 via a communication path (example, channel) 628. Communication path 628 carries signals 626 and may be implemented using wire or cable, fiber optics, a telephone line, a cellular link, an RF link, or other communication channels.

In this document, the terms "computer program medium" and "computer usable medium" are used to refer to media such as removable storage drive 616, a hard disk installed in hard disk drive 614, or the like. These computer program products provide software to computer-based system 600. The present disclosure is directed to such computer program products.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

In another aspect, the present disclosure is implemented primarily in hardware using, for example, hardware components, such as application specific integrated circuits (ASIC).

Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

A "module" or "component" herein can refer to a portion of a system, implemented locally or remotely or in combinations of local and remote systems, configured to perform a function that can be implemented using software, hardware, or combinations thereof in the above-described computing and network environments.

Various aspects disclosed herein are to be taken in the illustrative and explanatory sense and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flow-chart illustrations, can be implemented by either special purpose hardware-based computer systems which perform the specified functions or steps, or suitable combinations of special purpose hardware and computer instructions. Further, illustrations of the process flows, and the descriptions thereof may refer to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

It will be understood by those of skill in the art that all aspects pertaining to methods herein can be implemented by systems disclosed, and vice versa, without departing from the scope or spirit of the innovation, and that aspects described in terms of one embodiment need not be exclusive to that embodiment and can be implemented in other embodiments where such aspects are not indicated as limited to a particular implementation. The embodiments described are only examples, and each example does not include an exhaustive description of all possible combinations or alternatives in the interest of brevity. Additional components or steps can be added, components or steps illustrated can be deleted, or components or steps can be modified or rearranged, according to other aspects of the disclosure without departing from the scope or spirit of the innovation.

While aspects of the present disclosure have been particularly shown and described with reference to the examples above, it will be understood by those skilled in the art that various combinations of the disclosed aspects or additional aspects may be contemplated by the modification of the disclosed machines, systems, and methods without departing from the spirit and scope of what is disclosed. Such aspects should be understood to fall within the scope of the present disclosure as determined based upon the claims and any equivalents thereof.

What is claimed is:

1. A computer-implemented method, comprising:
   retrieving account information of a plurality of users comprising user information from a datastore;
   generating a graph using the retrieved account information, wherein generating the graph further comprising:
   generating a plurality of user nodes to represent each of the plurality of users;
   generating a plurality of field nodes to represent a plurality of fields associated with the plurality of users, and wherein each of the plurality of field nodes includes a value for the respective field;
   generating one or more edges between each user node and each field node associated with each user node;
   identifying a node pair, wherein each node pair comprises a first field node with an edge to a first user node and a second field node with an edge to a second user node, wherein the first field node and the second field node represent the same type of field;
   determining a similarity score between the first field node and the second field node of the node pair; and
   connecting the first field node and the second field node via an edge if the similarity score is more than a pre-specified threshold; and
   determining one or more cliques in the graph based on an edge limit defining at least one clique.

2. The computer-implemented method of claim 1, further comprising:
   identifying one or more user nodes in the graph, wherein the one or more user nodes are a member of the determined one or more cliques; and
   reporting the identified one or more user nodes for further review.

3. The computer-implemented method of claim 2, wherein reporting the identified one or more user nodes for further review further comprises preventing the users associated to the identified one or more user nodes from performing any transactions.

4. The computer-implemented method of claim 1, wherein the graph is an undirected graph.

5. The computer-implemented method of claim 4, wherein the graph is a disconnected graph.

6. The computer-implemented method of claim 1, wherein determining the similarity score further comprises:
   determining a distance between the value of the first field node and the value of the second field node; and
   calculating a similarity score based on the determined distance.

7. The computer-implemented method of claim 6, wherein the distance between the value of the first field node and the value of the second field node is an edit distance.

8. A computer-implemented method, comprising:
   receiving data relating to an entity, wherein the data is categorized according to a plurality of fields, wherein each of the plurality of fields associated with the entity is defined by one of a plurality of field types, and where each of the fields are respectively associated with a plurality of field values;

matching at least one of the field values to a value associated with a matching node in a graph database, wherein the graph database is defined by a plurality of nodes having one of the plurality of field types, and wherein the matching node has the same type as the field associated with the at least one of the field values;

searching the graph database for fuzzy matches for each of the plurality of field values relating to the entity by comparing each of the plurality of field values to a subset of the plurality of nodes having one of the plurality of field types matching the one of the plurality of field types associated with the respective one of the plurality of field values; and based on finding one or more fuzzy matches, executing a fraud response action.

9. The computer-implemented of claim 8, wherein the fraud response action comprises generating a report including the one or more fuzzy matches and transmitting the report to one or more evaluators.

10. The computer-implemented of claim 9, wherein the one or more evaluators comprises one or more machine learning models configured to evaluate the report and determine a validity of the report.

11. The computer-implemented of claim 8, wherein the fraud response action further comprises preventing the entity from executing any action.

12. The computer-implemented method of claim 8, wherein the fraud response action further comprises automatically closing an account.

13. The computer-implemented method of claim 8, wherein each of the one or more fuzzy matches is assigned a value, and wherein executing the fraud response is based on an aggregate of the values exceeding a response threshold.

14. A non-transitory computer-readable medium storing instructions that when executed by a processor effectuate operations comprising:

retrieving account information of a plurality of users comprising user information from a datastore;

generating a graph using the retrieved account information, wherein generating the graph further comprising:

generating a plurality of user nodes to represent each of the plurality of users;

generating a plurality of field nodes to represent a plurality of fields associated with the plurality of users, and wherein each of the plurality of field nodes includes a value for the respective field;

generating one or more edges between each user node and each field node associated with each user node;

identifying a node pair, wherein each node pair comprises a first field node with an edge to a first user node and a second field node with an edge to a second user node, wherein the first field node and the second field node represent the same type of field;

determining a similarity score between the first field node and the second field node of the node pair;

connecting the first field node and the second field node via an edge if the similarity score is more than a pre-specified threshold; and determining one or more cliques in the graph.

15. The non-transitory computer-readable medium of claim 14, wherein the operations comprise:

identifying one or more user nodes in the graph, wherein the one or more user nodes are a member of the determined one or more cliques; and reporting the identified one or more user nodes for further review.

16. The non-transitory computer-readable medium of claim 15, wherein reporting the identified one or more user nodes for further review further comprises preventing the users associated to the identified one or more user nodes from performing any transactions.

17. The non-transitory computer-readable medium of claim 14, wherein the graph is an undirected graph.

18. The non-transitory computer-readable medium of claim 14, wherein the graph is a disconnected graph.

19. The non-transitory computer-readable medium of claim 14, wherein the operations comprise:

determining a distance between the value of the first field node and the value of the second field node; and calculating a similarity score based on the determined distance.

20. The non-transitory computer-readable medium of claim 19, wherein the distance between the value of the first field node and the value of the second field node is an edit distance.

* * * * *